July 11, 1939.   R. B. LAWRENCE   2,165,712
COOKING DEVICE
Filed March 11, 1937   2 Sheets-Sheet 1
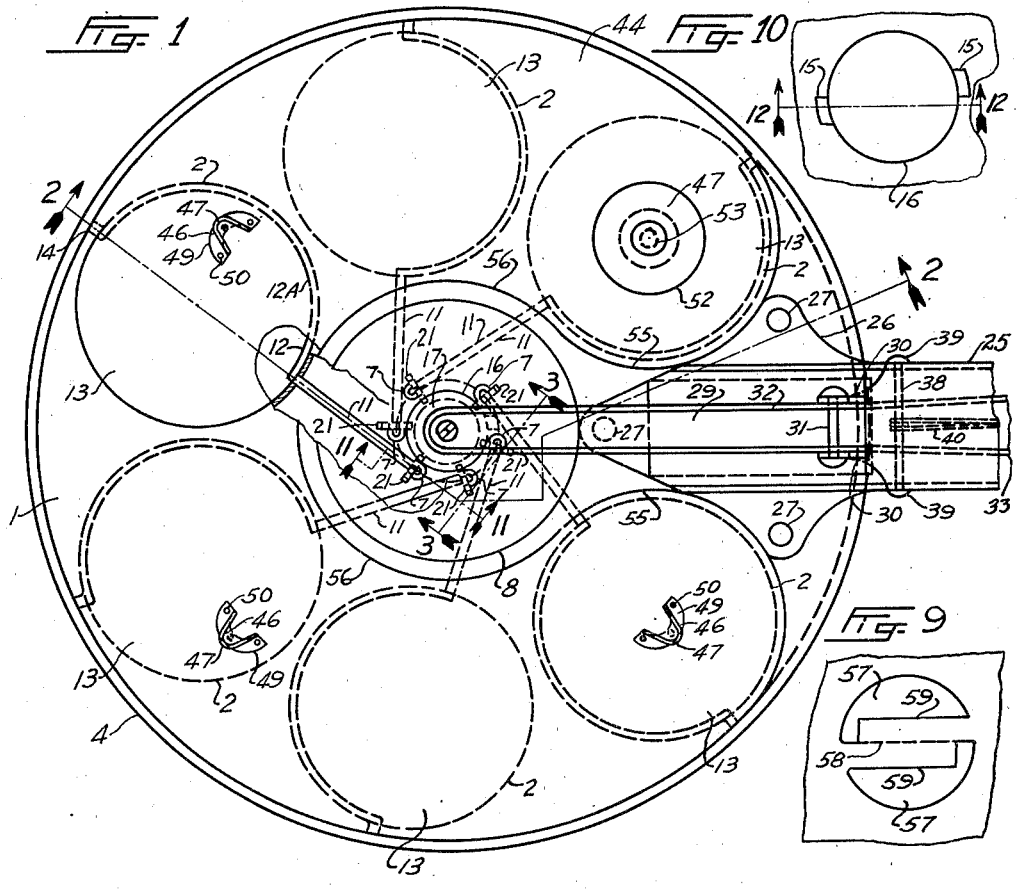
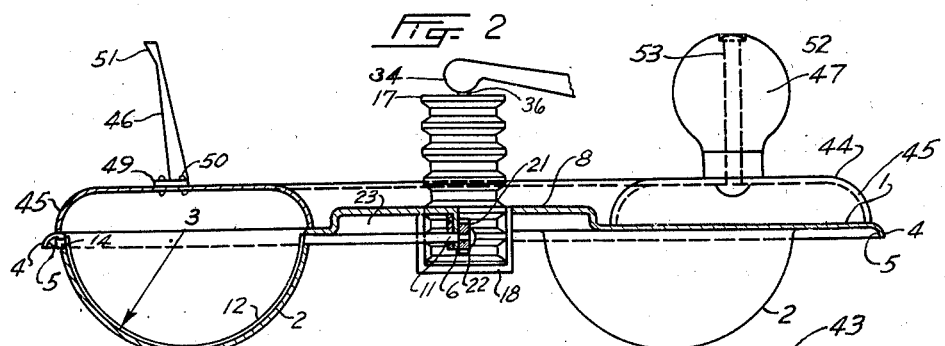
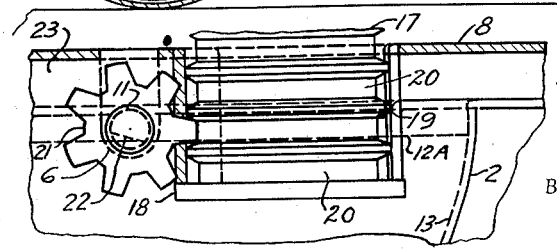
INVENTOR.
Richard B. Lawrence
BY George B. Ingersoll
ATTORNEY.

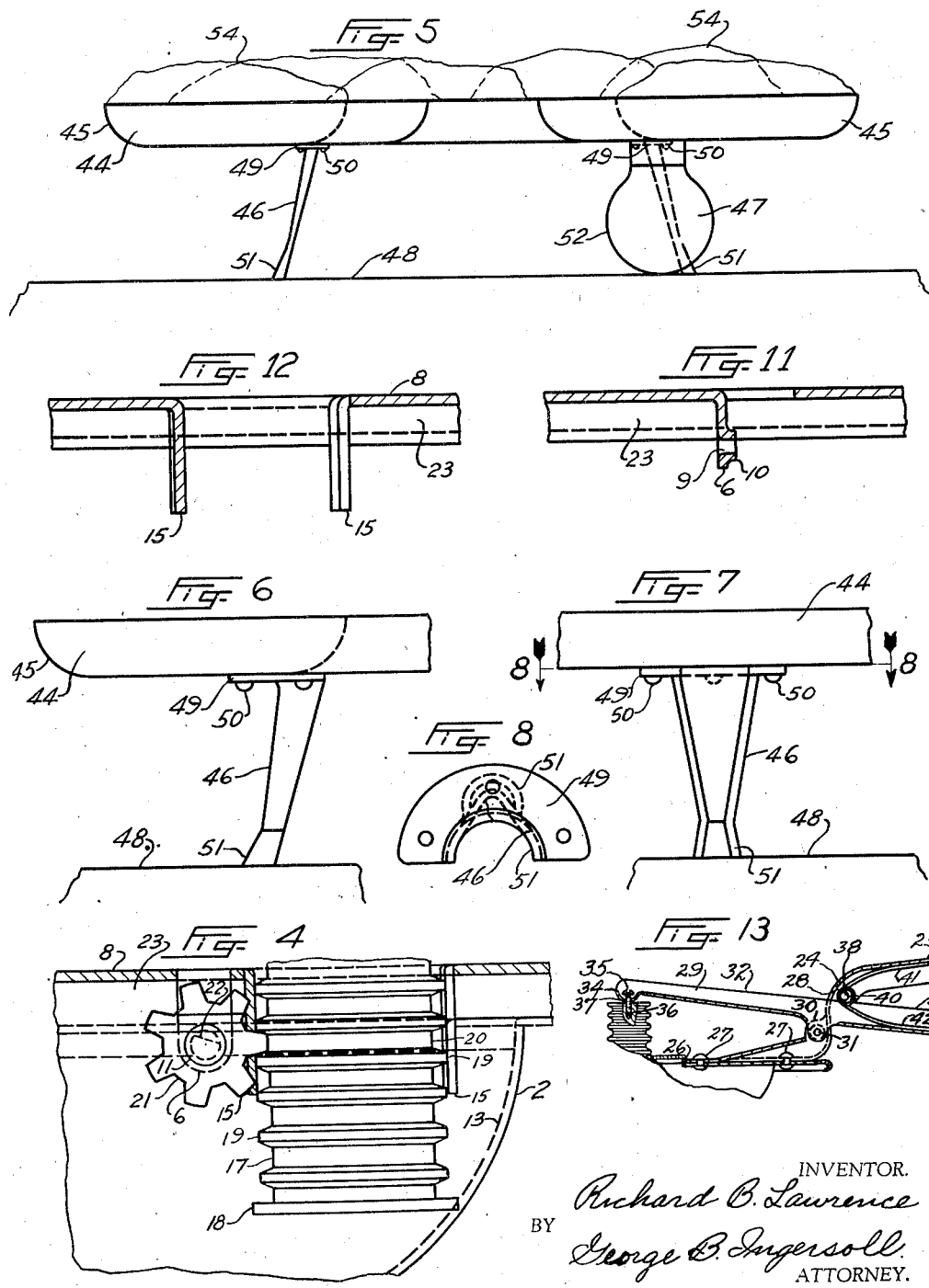

Patented July 11, 1939

2,165,712

UNITED STATES PATENT OFFICE 2,165,712

COOKING DEVICE

Richard B. Lawrence, Detroit, Mich.

Application March 11, 1937, Serial No. 130,272

5 Claims. (Cl. 53—6)

My invention relates to improvements in a cooking device having means for ejecting cooked materials from the cooking device, and the objects of my improvements are, first, to provide a cooking device provided with a plurality of bowl, cup or compartment portions for containing the units of material to be cooked, together with a cover member for enclosing the units of material; second, to provide a cooking device having a cover member therefor with leg members on the cover member to permit positioning the cooking device in reversed supported positions on the leg members; third, to provide a cooking device having a plurality of ejecting mechanisms with means for operating the ejecting mechanisms, the operating means being located below the upper surface of the main cooking unit; fourth, to provide a cooking device having a cover provided with leg members, one of the leg members of the cover member being constructed as a handle member for removal and placement of the cover member; fifth, to provide a cooking device with a cover member; sixth, to provide a cooking device with a cover member adapted to be inverted and used as a receptacle for receiving the units which have been cooked thereby; seventh, to provide a cooking device having portions of itself pierced and displaced to form bearing means for supporting revolvably mounted members of the cooking device; eighth, to provide a cooking device having a handle member secured thereto with a cover member having a throat portion to permit the cover member to assemble around and adjacent the handle member; ninth, to provide a cooking device with an embossed portion forming a clearance chamber for operating means of the cooking device; tenth, to provide a cooking device with a cover member having flanged edges around its periphery; eleventh, to provide a cooking device having cups or compartments with scraper means in the cups or compartments and rotatably supported in openings in oppositely disposed wall portions of the cups or compartments; twelfth, to provide a cooking device, having a gear member mounted on a shaft, with flattened portions providing driving means between the shaft and gear member, the flattened portions being positioned to permit operation of the gear member without imposing a thrust, due to gear engagement pressure, directly on the flattened portions; and thirteenth, to provide a cooking device with a bead formation extending around the periphery of the cooking device and constructed with a shape to facilitate the cleaning of the bead formation.

I attain these objects by the mechanism illustrated in the accompanying drawings, in which:

Figure 1 is a plan view of the cooking device together with its cover means therefor; Fig. 2, a sectional view of the cooking device taken on the line 2—2, Fig. 1; Fig. 3, a partial section of the cooking device taken on the line 3—3, Fig. 1; Fig. 4, a partial sectional view of the cooking device taken substantially on the line 3—3, Fig. 1 and disclosing the plunger member for actuating the scrapers or ejection members substantially at the end of its actuating stroke or movement; Fig. 5, a partial side view of the cover member of the cooking device supported upon the legs and handle thereof together with the cooked units supported thereon; Fig. 6, a partial side view of the cover member of the cooking device together with one of its leg members; Fig. 7, a partial side view of the cover and its leg member taken substantially at right angles to the cover and leg members disclosed in Fig. 6; Fig. 8, a plan view of the leg members disclosed in Figs. 6 and 7, said plan view being taken along the line 8—8, Fig. 7; Fig. 9, a partial view of the housing of the cooking device disclosing its central portion perforated initially in the operation of forming a pair of stop bosses thereon for positioning the plunger member at the end of its movement in one direction; Fig. 10, a bottom view of the stop members after they have been bent or formed outwardly from the main portion of the housing; Fig. 11, a sectional view of the housing taken on the line 11—11, Fig. 1; Fig. 12, a partial sectional view of the housing taken on a line 12—12, Fig. 10, said view not disclosing the shaft and gear members thereon; and Fig. 13, a partial side view of the cooking device and disclosing the handle mechanism thereof.

Similar numerals refer to similar parts throughout the several views.

My invention incorporates a cooking device similar to that disclosed in my United States Letters Patent, Serial No. 2,065,318, issued December 22, 1936, and this present application further incorporates improvements for use therewith.

The plate or housing 1 is preferably circular in shape although it may be made of any desired shape, outline or formation and is constructed from a relatively thin sheet of metal such as steel, aluminum or similar metal, and may be provided with a chrome, baked enamel, or similar finish to enhance its appearance, said housing 1 being provided with a plurality of depressions, compartments, cups, or container portions 2 which are semi-spherical in shape and have their centers located substantially in the plane of the upper surface of the main portion of the housing 1 as indicated at 3, at the end of the radial line in Fig. 2.

The compartments or containers 2 will be formed as integral parts of the housing 1 and will be preferably located radially around the center of the housing 1.

The housing 1 will be provided with a cylindrical or rolled edge or bead portion 4 extending around its periphery and at the lower side thereof, the edge or bead portion 4 forming a chamber 5.

The housing 1 is provided with a plurality of flange, bearing bosses or lug portions 6 which are located around the center of the housing 1 and between the compartments 2, said lug portions 6 being formed by piercing the openings 7 in the embossed or raised portion 8 which is preferably of cylindrical contour or formation and located at the central portion of the housing 1, the openings 7 being substantially of semi-circular shape at one of its ends to allow the lug portion 6 to be pressed or formed to extend substantially at right angles to the lower surface of the embossed portion 8, the lug portions 6 thus having a semi-cylindrical shape at their outer and lower ends to enhance their appearance and being integrally connected at their upper ends to the embossed portion 8.

The lug portions 6 are each provided with the punched hole 9 and by forming or extruding the portion 10 to extend from and to be integrally connected with the lug portion 6, the punched holes 9 extending entirely through the lug portions 6 and the portions 10 to form cylindrical bearing surfaces for the shaft or journal portions 11 of the scraper or ejector members 12 which are provided with inclined or angular cutting surfaces at each of their sides for engaging and scraping the inner surfaces 13 of the compartments 2.

The scraper or ejector members 12 are each provided with the extension or shank portion 14 which is cylindrical in shape and of substantially the same diameter as the journal portion 11, said shank and journal portions 11 and 14 having their axes located in alignment, the shank portions 14 and the journal portions 11 extending through suitable openings in the side walls of the compartments 2 and forming the bearing means therefor, said openings being located at opposite sides of each of the compartments 2.

It is to be noted that the embossed portion 8 which is formed or pressed with substantially a cylindrical shape extends above the main horizontal surface of the housing 1, the embossed portion 8 being of sufficient size to extend adjacent the inner sides of the compartments 2, the embossed portion 8 thus substantially increasing the structural strength and rigidity of the housing 1 at its central portion. The embossed portion 8 is extruded at its central portion to provide the boss portions or stop members 15 which extend downwardly from the underside of the embossed portion 8, the boss portions 15 being provided from the punched hole or bore 16 which provides a bearing for the journal portion formed by the outside surfaces of the plunger or shaft member 17.

The plunger or shaft member 17 is provided with the collar, flange or shoulder portion 18 at its lower end for engaging the lower edge or end surfaces of the stop members 15 of the housing 1 to limit the upward travel or movement of the plunger or shaft member 17.

The plunger or shaft member 17 is further provided with a plurality of teeth or collar portions 19 which are formed by turning the grooves 20 therebetween. The grooves 20 and the teeth 19 are provided wtih no pitch but extend circumferentially around the plunger 17 in parallel planes, the teeth 19 being formed with a contour similar to conventional gear teeth, thus adapting them to engage each of the gear members 21 which are secured to the inner ends of the shaft or journal portions 11 of the scraper members 12 by forming the inner ends of the journal portions 11 with suitable flattened portions 22 over which the gear members 21 are placed and further secured as by riveting at the outer ends of the journal portions 11, the gear members 21 thus being located at the inner side of the lug portions 6 and within the clearance space 23 formed by the embossed portion 8.

The flattened portion 22 of the journal portions 11 thus fits into a similar hole or opening in the gear 21 to provide driving means between the gear 21 and the shaft portion 11, the flattened portion 22 being located substantially as disclosed in Fig. 3 when the plunger member 17 is at the uppermost end of its movement, the flattened portion 22 being positioned substantially as shown in Fig. 4 when the plunger member 17 is at the lower end of its movement, thus positioning the flattened portion 22 at all times so that the direct thrust or resultant pressure engagement between the teeth of the plunger 17 and the gear members 21 are therefore not imposed directly against the surface of the flattened portion 22, thus providing that said pressure engagement between said teeth will exert its resultant load or pressure directly on the cylindrical surface only of the shaft portion 11 throughout the working turn or movement of the shaft portion 11.

It will thus be readily noted that the scraper members 12 are thus adapted to be rotated in their bearings when the gear members 21 are revolved by engagement with the teeth 19 of the plunger 17 when the plunger 17 is actuated or operated by means which are now to be disclosed.

The handle member 24 is formed with a handle portion 25 which is bent upwardly to extend beyond the main or horizontal surface of the housing 1, the handle member 25 being formed with the flange portion 26 which engages and extends adjacent the main or upper horizontal surface of the housing 1 and is secured thereto by the rivets 27, the handle member 24 being provided with an opening 28 extending therethrough and through which extends the lever member 29.

In order to provide a support for the lever member 29, the handle member 24 is provided with the flanges 30 through which extends the pin or shaft 31 which is riveted or upset at its ends to retain the pin 31 longitudinally.

The lever member 29 is provided with the flange portions 32 through which extends the pin 31 for pivotally supporting the lever member 29. The lever member 29 is provided with a handle portion 33 which extends through the opening 28 of the handle member 24 at the underside of the handle portion 25.

The lever member 29 is provided with the depressed portion 34 at its inner end, said depressed portion 34 having a semi-spherical shape to engage a similar semi-spherical surface at the lower portion of the head 35 of the screw 36 which extends through the clearance opening 37 of the depressed portion 34 and threadedly engages the upper end of the plunger 17, thus securing the lever member 29 to the plunger 17 and yet allowing pivotal motion of the lever member 29 relative to the screw 36 and the plunger 17.

The lever member 29 and the handle member 24 are formed or pressed from sheet material to each provide U shaped portions having open sides facing one another in the handle portions 25 and 33.

The pin or shaft 38 extends through side walls of the handle member 24 and is retained longitudinally by the upset rivet ends 39. The resilient or spring member 40 is secured to the pin or shaft member 38 as by coiling therearound, and is provided with the end portion 41 extending within and contacting the inner surface of the handle member 25, the spring 40 being further provided with the end, 42 which extends within and engages the inner surface of the U shaped portion of the handle member 33, thus tending to resiliently urge the handle portion 33 away from the handle portion 25 and to move the inner end of the lever member 29 together with the depressed portion 34 and the screw 36 upwardly to maintain the plunger 17 in its uppermost position in which the collar or shoulder portion 18 engages the lower end or edge surfaces of the stop members 15 of the housing 1, thus tending to always maintain each of the scrapers 12 in a position at the upper side of the compartments 2 and substantially adjacent an upper edge of each of the surfaces 13, as at 12A, Fig. 3. It is to be noted that the extreme bottom surfaces of the compartments 2 will be located in a common plane and this will permit the cooking device to be supported by said bottom portions of said compartments 2 on a table or similar supporting surface as indicated at 43 in Fig. 2.

Also it is to be noted that the cover member 44 will form a lid or pan having flanged edges 45 extending therearound, thus being adapted for use as a receptacle for turning or ejecting food or baked articles thereon from the cooking device when the cooking device has been inverted to place the cover member 44 in an upright position and supported by its leg or feet members 46 together with its handle member 47, the plurality of the leg or foot members 46 together with the handle member 47 thus permitting the cover member 44 to be supported on a table or similar supporting surface 48, as disclosed in Figs. 5, 6 and 7. The leg or feet members 46 are preferably constructed of pressed material and provided with a flange 49 to facilitate securement to the under side of the cover member 44 as by rivets 50 or by similar fastening means.

The leg or feet members 46 will be formed to extend outwardly at an angle relative to the vertical to position its contact portions 51 in spread positions to provide or secure additional support for the cover member 44.

It is to be noted that one of the legs or feet members will be omitted and in its place will be assembled the handle member 47 which is preferably constructed of wood, rubber or similar material with heat insulation characteristics which will insulate the handle member 47 provided with the handle portion 52 which will facilitate grasping by the hand of the operator as well as providing a surface for contacting the supporting surface 48, the handle member 47 being secured to the cover member 44 by a rivet or similar fastening member 53.

It is to be noted that the cover member 44 will thus provide a lid or cover means upon which the units which have been cooked in the cooking device may be supported thereon, said cooking units being disclosed at 54, in Fig. 5.

Also it is to be noted that the cover member 44 will be provided with a throat or opening 55 adjacent the handle member 24 to permit the cover member 44 to assemble closely adjacent the handle member 24 and to cover the open sides of the plurality of compartments 2, the cover member 44 being provided with an opening 56 at its central portion for extending around the embossed portion 8.

Also it is to be noted that the bore 16 through the embossed portion 8 will be initially formed by piercing the pair of oppositely disposed openings 57 as disclosed in Fig. 9.

Also in the same piercing operation the central portion of the stock remaining between the openings 57 will be sheared as along the dotted line 58, the shearing of the line 58 thus providing the pair of extensions 59 which are then formed in the next operation to extend substantially at right angles to the wall surface of the embossed portion 8 to provide the stop members 16 as disclosed in Figs. 10 and 12.

It is now to be noted that I have invented a cooking device adapted to bake a plurality of muffins, biscuits, etc., and is also adapted to cook and retain therein eggs, either in a poaching or boiling operation, in the various compartments thereof and for many other similar cooking operations, as well as molding jellies, etc.

In operation, the pastries are mixed and poured into the compartments 2 or in the case of jelly these are prepared in their fluid or semifluid state and placed therein, the scraper members 12 always being maintained substantially adjacent an uppermost edge portion of the compartments 2 due to the spring 40 urging the handle members 25 and 33 apart, thus maintaining the plunger member 17, together with the scraper members 12 in initial positions as disclosed at 12A, Fig. 3.

After the cooking device has been removed from its position in which the cooking operation is performed or after the jelly molds have been congealed, the operator grasps the handles 25 and 33 and by compressing and moving the handle member 33 toward the handle member 25, thus compressing the ends 41 and 42 of the spring 40, the operation of moving the handle 33 causing the lever member 29 to pivotally move about the pin member 31 and the plunger 17 to move in and out through the bore 16 of the embossed portion 8, the lever member 29 forcing the plunger 17 downwardly in the bore 16 of the embossed portion 8 with the teeth 19 of the plunger 17 engaging the teeth of the gear members 21 and causing the scraper members 12 to rotate or revolve so that the scraper portions thereof will rotate across the surfaces 13 of the compartments 2, the downward movement of the plunger 17 being limited in one direction by the amount of space between the handle members 25 and 33, the upward movement of the plunger 17 in an opposite direction being limited by the flange 18 engaging the ends of the stop members 15.

With the operation of the scraper members 12 and their consequent movement across the inner surfaces 13 of the compartments 2, the baked or similar units, such as pastries, jelly molds, etc., will be scraped from the surfaces 13 of the compartments 2 and then will immediately drop and be ejected therefrom in an upside down position and, if desired, on the cover member 44 is disclosed in Fig. 5.

As soon as the baked or congealed units have been ejected on to the cover member 45 or similar member, from the compartments 2, the springs 40 will exert thrust and a spreading movement to cause the handle member 33 to immediately move away from the handle member 25, thus causing the plunger member 17 to be raised or moved to its upper or initial position which will further cause the scraping members 12 to return from their positions adjacent one edge portion to an opposite edge portion of each of the surfaces 13 of the compartment 2.

I claim:

1. In a cooking device, the combination of a plate member having an embossed portion at its center and providing a clearance chamber, said plate member being further provided with a plurality of semi-spherical depressed portions arranged around said embossed portion, said plate member being further provided with an opening through its embossed portion together with stop members extending from said embossed portion adjacent its opening, said plate member being further provided with a plurality of bearing bosses below and within said clearance chamber formed by said embossed portion, a scraper member rotatably mounted in each of said semi-spherical depressed portions of said plate member and provided with cutting edges adjacent said semi-spherical depressed portion, each of said scraper members being provided with oppositely disposed shafts extending through side walls of said semi-spherical depressed portion, one of said shafts of each of said scraper members being further supported in one of said bearing bosses of said plate member, a plunger member slidably mounted in said opening of said embossed portion and provided with teeth portions, said plunger member being provided with a flange portion for engaging said stop members, gear members fixedly secured to said shafts of said scraper members supported in said bearing means, said gear members engaging said teeth of said plunger member, a handle member secured to said plate member, a lever member pivotally mounted and operatively connected with said plunger member, resilient means mounted between said handle and said lever members and tending to urge said handle and said lever members apart, and a cover member for said plate member, said cover member being provided with feet members together with a handle member and having an opening centrally therethrough through which said plunger member extends for actuating contact by said lever member.

2. In a cooking device, the combination of a plate member provided with an embossed portion forming a clearance chamber therebelow, said plate member being provided with a plurality of semi-spherical cups arranged around said embossed portion, scraper members rotatably mounted and engaging surfaces of said semi-spherical cups, gear members located within said clearance chamber below said embossed portion, each of said gear members being operatively connected with one of said scraper members, a plunger member slidably supported in said embossed portion and engaging said gear members, a handle member secured to said plate member, a lever member pivotally mounted and connected with said plunger member, resilient means mounted between said handle and said lever members, and a cover means for said plate member and extending over said semi-spherical cups, said cover means being provided with leg members, said plunger member extending through said cover for actuation by said lever member.

3. In a cooking device, the combination of a plurality of cups, a plurality of scraper members rotatably mounted and engaging said cups, gear members on each of said scraper members, a sole plunger member having teeth engaging said gear members, means for actuating said sole plunger member, and a cover means for said plurality of cups, said plunger extending outwardly through said cover means for contact by its actuating means.

4. In a cooking device, the combination of a plate member provided with a plurality of cup portions adapted to support the cooking device upon their lowermost surfaces, scraper members rotatably supported and each engaging a cup portion, gear means connected with said scraper members, means for operating said gear means, and a cover member for said cup portions of said plate member, said cover member being provided with leg members adapted to support the cooking device when in an inverted position and having an opening centrally therethrough through which said gear means are operated.

5. In a cooking device, the combination of plate member provided with an embossed central portion together with a plurality of cups arranged around said embossed central portion, scraper members rotatably mounted in said cups and provided with gear members, a plunger slidably mounted in and extending through said embossed central portion, said plunger being provided with teeth engaging said gear members, a handle member secured to said plate member between a pair of said cups, a lever member pivotally mounted and operatively connected with said plunger, said lever member being provided with a handle, resilient means between the handle of said lever member and said first mentioned handle member to force them apart, and a cover member mounted on said plate member and provided with an opening surrounding said embossed central portion of said plate member, said cover member being provided with a throat portion adjacent said handle member.

RICHARD B. LAWRENCE.